(12) United States Patent
Vu

(10) Patent No.: US 6,396,522 B1
(45) Date of Patent: May 28, 2002

(54) SELECTION NAVIGATOR

(75) Inventor: Duy Minh Vu, Puteaux (FR)

(73) Assignee: Dassault Systemes (FR)

( * ) Notice: Subject to any disclaimer, the term of this patent is extended or adjusted under 35 U.S.C. 154(b) by 0 days.

(21) Appl. No.: 09/265,136

(22) Filed: Mar. 8, 1999

(51) Int. Cl.[7] .............................................. G06F 3/00
(52) U.S. Cl. ..................... 345/848; 345/852; 345/419; 345/856
(58) Field of Search ................................ 345/355, 353, 345/145, 146, 339, 348, 419, 848, 841, 856, 860, 852, 850, 849

(56) References Cited

U.S. PATENT DOCUMENTS

| | | | | |
|---|---|---|---|---|
| 4,868,766 A | * | 9/1989 | Oosterholt | 364/552 |
| 5,555,354 A | * | 9/1996 | Strasnick et al. | 395/127 |
| 5,621,905 A | * | 4/1997 | Jewson et al. | 395/353 |
| 6,094,196 A | * | 7/2000 | Berry et al. | 345/355 |
| 6,097,393 A | * | 8/2000 | Prouty, IV et al. | 345/419 |

* cited by examiner

*Primary Examiner*—John Cabeca
*Assistant Examiner*—Mylinh Tran
(74) *Attorney, Agent, or Firm*—Joseph P. Kimcart, Esq.; Clifford Chance Rogers & Wells LLP

(57) ABSTRACT

The invention provides generally a method and system for selecting an element of a computer generated drawing model graphically represented on a computer screen wherein each selectable element of the model occupies a position in a hierarchical tree describing the model. A pointer can be used to specify a position on the screen and pre-selecting an element on an axis extending from the position of the pointer along a predetermined direction such that the direction is not in the plane of the screen. Pre-selection can be moved from a first position on the hierarchical tree to a second position on the hierarchical tree in response to activation of an arrow mechanism. Full selection can be accomplished by activating a selection mechanism.

33 Claims, 9 Drawing Sheets

SELECTION NAVIGATOR

BACKGROUND

Computer systems can be used to model objects and fluids. Computer application software can be used to display a model including an image of an object or a fluid flow. Images often include one or more elements or parts. Selection of an element is usually accomplished with a pointing device associated with the computer displaying the model. A cursor on a computer screen is typically directed by a pointing device, such as a mouse, to make a selection. A pointing device can position a cursor at different points, each point correlating to an X and Y coordinate. Different elements of a model are commonly selectable by using a pointing device to position the cursor at a point intersecting the element and clicking a button on the pointing device.

Modeling with three or more dimensions can also be accomplished on a computer system and displayed on a computer screen. In the context of computer graphics, the X and Y axes are usually placed in the plane defined by the computer screen while the depth or Z axis at any given point on the screen is defined either by the theoretical line going from that point on the screen to a human eye placed at some distance from the screen (conical representation) or by the normal to the screen in that point (cylindrical representation). A three-dimensional representation may include features of an object depicted with horizontal (X) and vertical (Y) axis and also depth (Z axis). However, selection of an element included in a model with more than two dimensions may require the identification of an intersection with an element, or some other method of specifying which elements are selectable.

Pointing devices utilized by point and click systems can travel in two dimensions across a computer screen allowing for horizontal or vertical movement. As it relates to graphical designations, a pointing device such as a mouse provides for movement along X and Y axis. However, as a two axis pointing device cannot simultaneously make a depth designation such as in the Z direction, ambiguity can result as to the exact element being pointed to when more than one element is intersected by the Z axis corresponding to the point (or pixel) on the screen designated by the X,Y coordinates.

A user of a CAD/CAM/CAE (computer aided design/manufacture/engineering) or PDM II (product data management, second version) system, may need to select a particular element in a complex structure that is graphically represented on a screen in a computer system. One known way to select an element is for a user to reference a hierarchical tree representing the components or specifications of the structure. The tree can show successive degrees of details allowing a user to select a detail in the tree. In many CAD/CAM/CAE applications, however, the hierarchical tree is very large and extremely complex. Many users find it confusing to try and locate one element of an overall product as a position in a complex hierarchical tree representing a structure in terms of product components or design specifications. Generally, human operators prefer to reference a graphical representation directly.

It would be useful to have a convenient mechanism to allow the selection of an element directly on the graphical representation of the computer model.

SUMMARY OF THE INVENTION

The invention provides generally a method and system for selecting an element of a computer generated three-dimensional model graphically represented on a computer screen wherein each selectable element of the model occupies a position in a hierarchical tree describing the model.

The invention further provides a method and system for allowing a user to navigate through a computer generated model including various selectable elements until an element to be selected is reached.

In one aspect the invention includes detecting a position of a pointer on the computer screen and pre-selecting an element of the model on an axis extending from the position of the pointer along a predetermined direction wherein the direction is not in the plane of the screen. In one embodiment of the invention the predetermined direction is the direction normal to the plane of the computer screen and the axis is the normal to the plane of the screen at the position of the pointer. In another embodiment, the axis can be defined as the straight line drawn from the eye of a user sitting in front of the screen and intersecting the plane of the screen at the position of the pointer. It will be readily understood, however, that the direction of the axis can be any direction, provided it is not in the plane of the screen itself. In all cases the axis is called the depth axis. Depending on the position of the pointer, the depth axis may intersect one or more selectable elements of the model or none at all. If no selectable element is intersected by the depth axis, no element is pre-selected. If one selectable element only is intersected by the depth axis, this selectable element is pre-selected. If more than one selectable element is intersected by the depth axis, as will usually be the case, one of these selectable elements is pre-selected. In a preferred embodiment the pre-selected element is the selectable element of the model which is closest to the eye of the user in the three-dimensional representation of the model. Pre-selection of a selectable element is preferably represented by highlighting the element.

Pre-selection can be moved from one selectable element located at a first position on the hierarchical tree to a selectable element located at a second position on the hierarchical tree in response to activation of a navigation control mechanism. In a preferred embodiment the hierarchical tree describes the model in terms of its design specifications but the invention applies as well to the case where the tree would describe the model in terms of its product components or in any other way. When, as a result of the navigation, the element to be selected has been reached, full selection can be accomplished by activating a selection mechanism. In one embodiment of the invention, the navigation command mechanism is a set of directional arrow keys on a keyboard associated with the computer and the selection mechanism is a primary button on the mouse or the keyboard Enter key.

In another aspect of the invention, a user interface can include a first display region to display a computer generated model and a second display region to display the hierarchical tree describing the model. Any pre-selection of a selectable element of the graphical representation of the model, e.g. by highlighting it, results in the same element being pre-selected or highlighted in the hierarchical tree.

In still another aspect of the invention, an image of a user activatible navigation control mechanism, or navigator, is displayed on the computer screen in the vicinity of a point indicated by a pointing mechanism. In a preferred embodiment, the pointing mechanism is a pointer associated with a computer mouse and the image of the navigator is a representation of four directional arrow keys together with a central button corresponding to the Enter key of a keyboard.

An area on the screen surrounding the point indicated by the pointing mechanism and encompassing the image of the navigator can be defined as a navigator area. Subsequent movements of the mouse pointer within the limits of the navigator area do not change the location of the point originally indicated by the mouse pointer. This makes it possible for the mouse pointer to be used for activating the various elements of the navigation control mechanism.

In a preferred embodiment, activation of the up and down arrow keys control the navigation along the depth axis, so that the various selectable elements found along that axis can be pre-selected. Activation of the left and right arrow keys control the navigation along branches of the hierarchical tree, so that the various selectable elements in a branch of the tree can be pre-selected. When the navigation control mechanism is displayed on the screen, activation of the central button or of the Enter key on the keyboard accomplishes the full selection of the element then pre-selected. When the navigation control mechanism is not displayed on the screen, clicking on the primary button of the mouse accomplishes the full selection of the element then pre-selected.

Embodiments can include, for example, a computer program stored on a computer readable medium and a user interface invocable by an application program.

DETAILED DESCRIPTION

Figure 1:
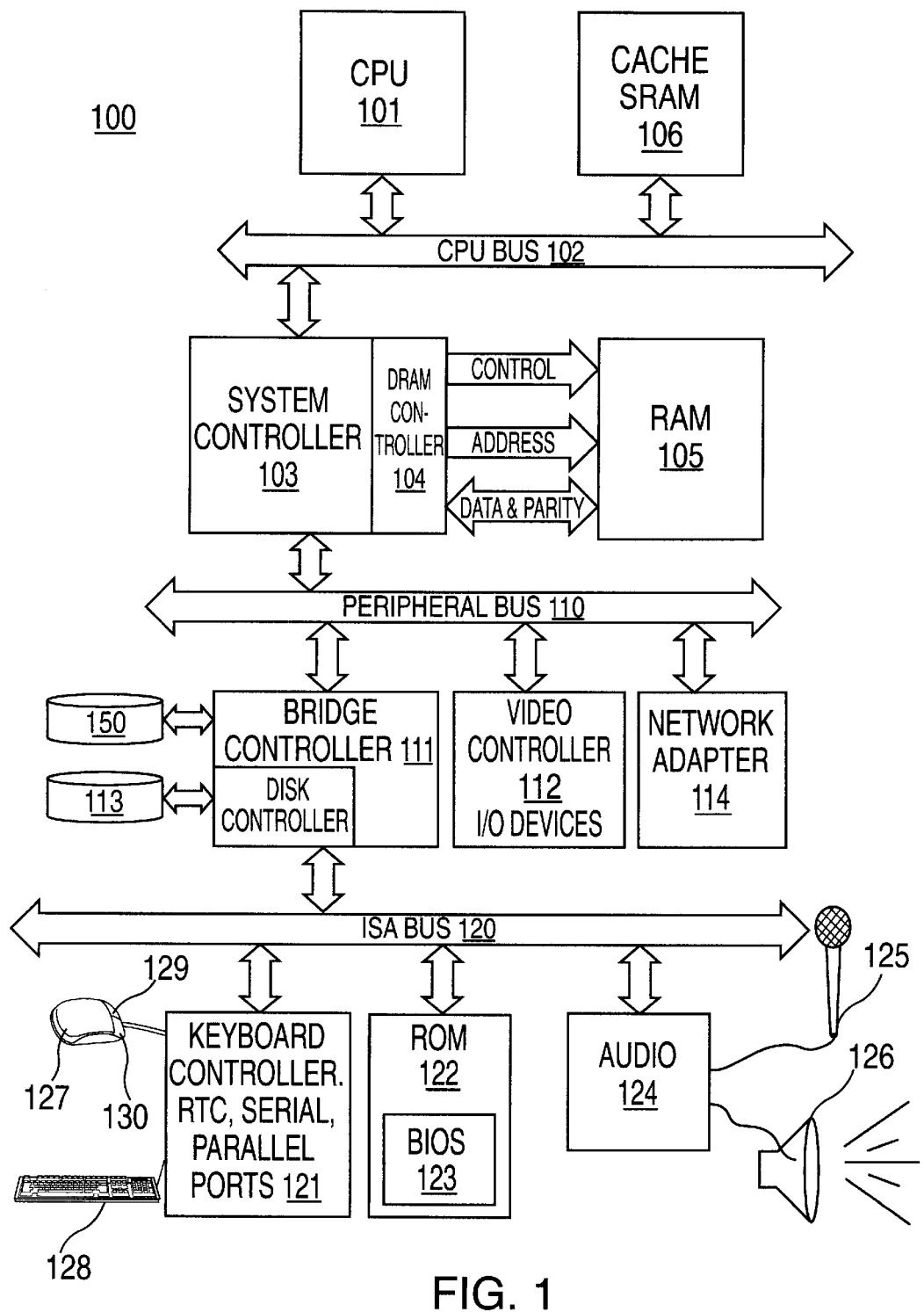
FIG. 1 is a computer hardware diagram.

FIG. 1 depicts physical resources of a computer system 100. The computer 100 has a central processor 101 connected to a processor host bus 102 over which it provides data, address and control signals. The processor 101 may be a conventional general purpose single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor. The microprocessor 101 has conventional address, data, and control lines coupling it to a processor host bus 102.

The computer 100 includes a system controller 103 having an integrated RAM memory controller 104. The system controller 103 is connected to the host bus 102 and provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. Accessory devices including, for example, a video display controller 112 and network controller 114 can be coupled to the peripheral bus 110.

Input devices such as a keyboard 128 and a pointing device 127 also can connect to the controller 121. A pointing device 127, such as a mouse, can have an activation mechanism such as a button to "click". Typically, a mouse will have a primary button 129 designated as the left button for right handed users. The primary button 129 can be clicked to select an item on screen with a cursor. A secondary button 130 can be used for various programmed functions.

The computer 100 also includes non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services.

An operating system may be fully loaded in the RAM memory 105 or may include portions in RAM memory 105, disk drive storage 113, or storage at a network location. An operating system, such as Windows 95™ or Windows NT™ provides functionality to control computer peripherals such as devices 112–114, 121, and 124, and to execute user applications. Application software programs stored on a disk 113 or accessed at a remote server. Application software can include commercially available software programs such as computer aided drawing and manufacturing software, scientific software, internet access software, word processing software, and many other types of software. User applications may access computer system peripherals 112–114, 121, and 124 through an application programming interface provided by the operating system and/or may directly interact with underlying computer system 100 hardware.

Figure 2:
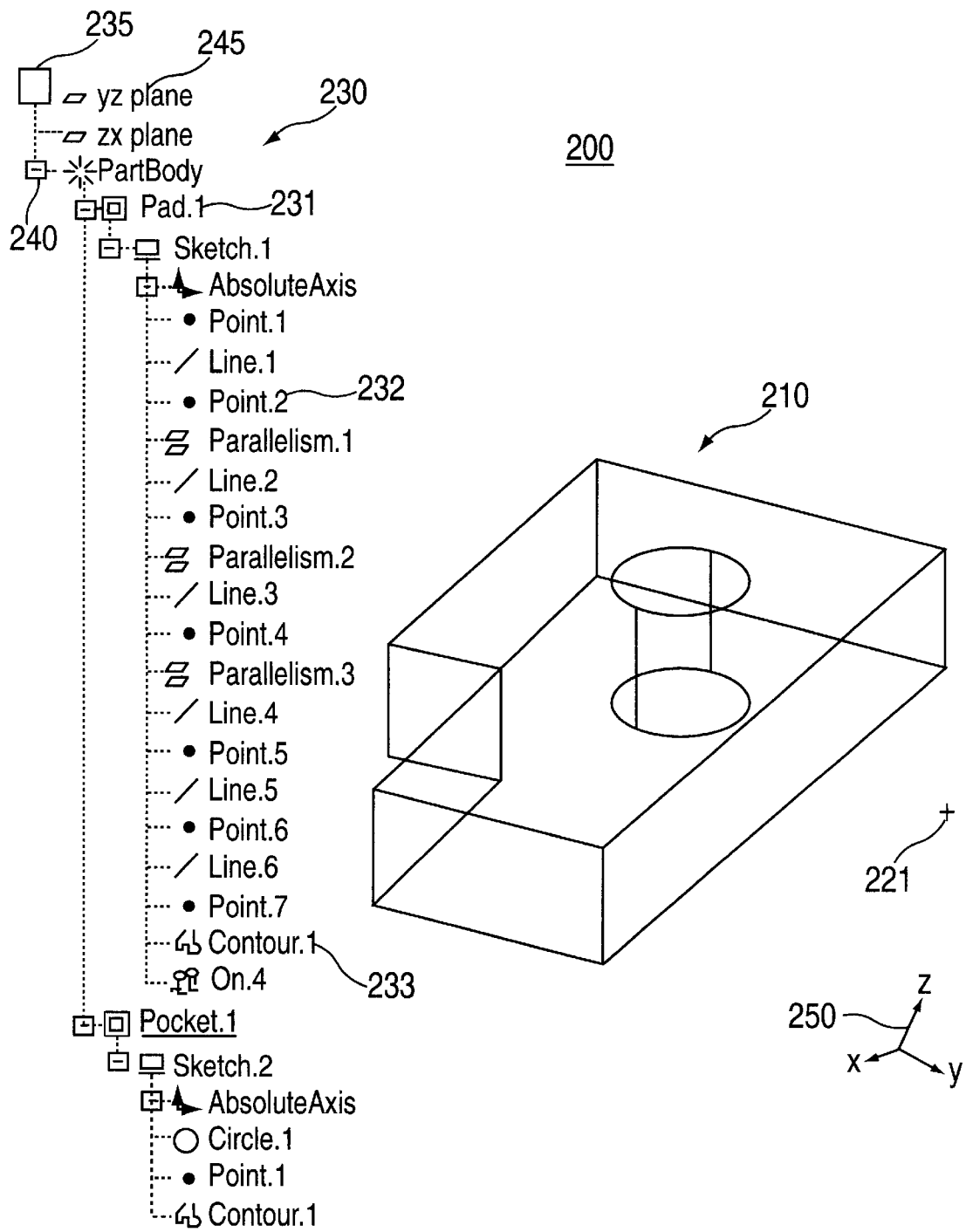
FIG. 2 is an isometric view of a three-dimensional computer model used as an example to explain the operation of the invention.

FIG. 2 shows an isometric view of a three-dimensional computer generated model of an object, in the present example a notched block 210, that can be produced by a CAD/CAM/CAE/PDM II application software program accessing operating system functionality to send control commands to the display controller 112. In the chosen example, the view shown on FIG. 2 is for explanation purposes only. What the user actually sees on the screen is the profile view of the same model shown on FIG. 3. It is also shown on FIG. 2, alongside model 210 on the same screen 200 a hierarchical tree 230 representing the various design specifications of the model. The whole model appears as PartBody 240, while the block itself appears as Pad 1, reference 231, on FIG. 2 and the pocket in the block appears as Pocket 1. References 232 and 233 point to other, more detailed, specifications for a point, Point 2, and a contour, Contour 1, respectively, which are part of the design specifications of Pad 1. It will be apparent that some of the design specifications do not correspond to selectable elements of the graphical model. This is the case, for example, for elements such as Parallelism or AbsoluteAxis. The tree is shown on FIG. 2 for illustrative purposes but it does not need to be displayed for practicing the invention. Displaying the tree alongside the graphical view of the model is a design option, which may be selected by the user. This applies to the other computer screens on FIGS. 3–6 as well.

Figures 3, 4:
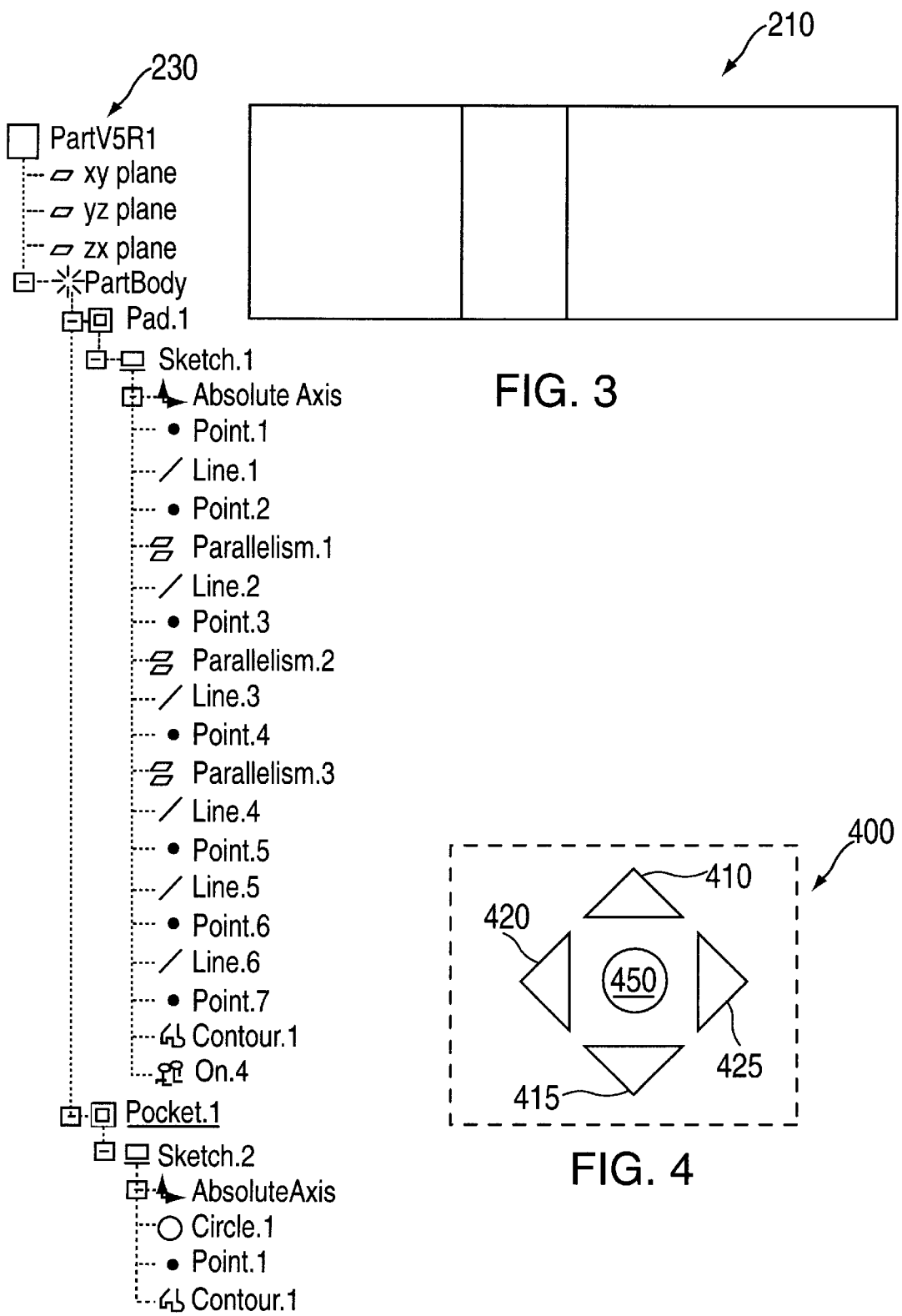
FIG.3 is a profile view of the model in FIG. 2 as it can appear on a computer screen in the example.
FIG. 4 is an illustration of a user activatible navigation control mechanism according to the invention.

Referring now to FIG. 3, a profile view of the notched block 210 is shown and will be assumed to be what the user actually sees on the screen when working with the model in the example given here.

Referring now to FIG. 4, a programmable menu 400 can provide navigation and selection functions. In one embodiment, a programmable menu 400 can be shown on the screen with user interactive controls 410, 415, 420, 425 and 450 to operate as a user interactive navigation control mechanism. The operation of this navigation control mechanism will be explained in more detail later. In a preferred embodiment, the navigation control mechanism, or navigator, comprises four arrows 410, 415, 420 and 425 corresponding to the four directional arrows on a keyboard and a central button 450 corresponding to the Enter key on the keyboard. When the navigator is in use, as will be described later, activation of one of the arrows on the navigator has the same effect as depressing the corresponding arrow key on a keyboard associated with the computer. Similarly, activating the central button has the same effect as depressing the Enter key on the keyboard. In a preferred embodiment, activation of any arrow or the central button is done by clicking on them with the primary button of the computer mouse.

Figure 5A:
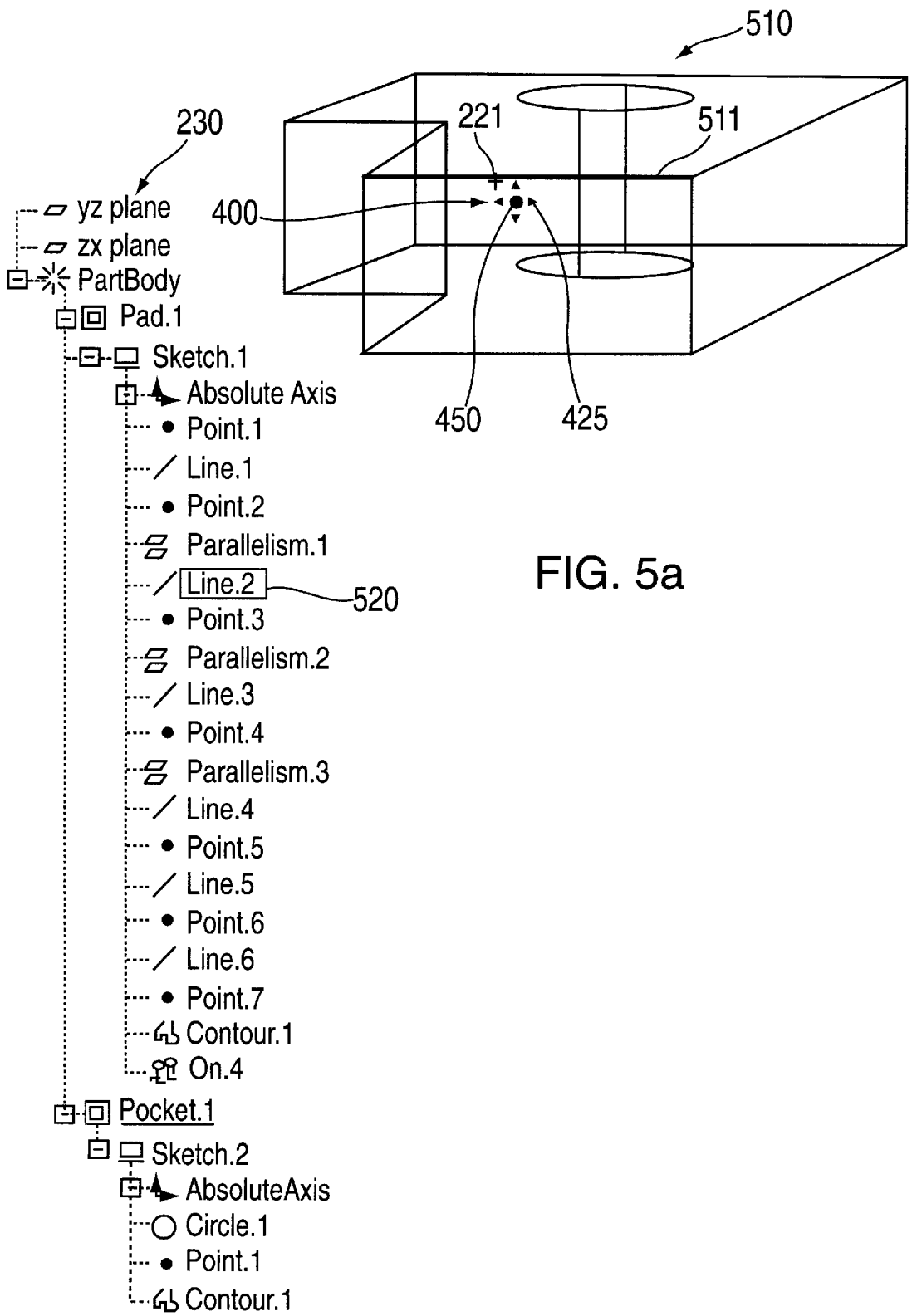
FIG. 5a is an isometric view of the model with a front edge pre-selected.

Referring now to FIGS. 5a through 5d, a specific example of one embodiment of the invention is illustrated. As already mentioned above, FIGS. 5a through 5d do not show the model as it actually appears on the screen to the user but show the model in isometric view to better explain the operation of the invention. On FIG. 5a model 510 is shown with pointer 211 of the mouse shown in the position shown as a cross hair, as a result of a user moving the pointer across the screen to that position. In one embodiment, the system is programmed for testing if the pointer stays at the same position for a short period of time, which may be 0.5 second or less. If so, the system pre-selects, for example by way of some form of highlighting, the selectable element of the model that is closest to the eye of the user on the depth axis at the location of the pointer, in this case front edge 511. It will be understood that the pre-selection of the selectable element that is closest to the eye of the user is only one of many possible design options and that the system could be programmed to pre-select instead the selectable element which is farthest from the eye of the user or any other selectable element on the depth axis. In another embodiment, there is no testing whether the pointer remains at the same position for any period of time. As soon as the pointer moves to a point on the screen corresponding to a pixel in the image of the model, the system pre-selects a selectable element according to one of the design options mentioned above and continues the pre-selection process until the pointer stops at a location on the screen decided by the user. For the rest of the description of FIGS. 5a through 5d, the cross hair will indicate the final position reached by pointer 211, as selected by the user. In a preferred embodiment, the system is programmed to display in the vicinity of the cross hair, after a time delay which may be up to a few seconds, the navigator 400 shown in more detail on FIG. 4. An area of the screen (not shown on FIG. 5a) around the cross hair and encompassing navigator 400 is defined as the navigator area. When the navigator is displayed, movement of mouse pointer 211 within the limits of the navigator area does not change the position of the cross hair. Should, however, pointer 211 be moved by the user outside the navigator area, the position of the cross hair would then start again to follow the movement of the pointer. FIG. 5a also shows on the left hierarchical tree 230 as already shown on FIG. 2. As already mentioned, displaying hierarchical tree is an optional feature of the invention. When it is displayed, as on FIG. 5a, the reference of the element pre-selected on the graphical representation of the model is also pre-selected on tree 230. In the example shown on FIG. 5a, highlighted front edge 511 corresponds to highlighted Line 2 on the design specification tree, bearing the reference 520.

Figure 5B:
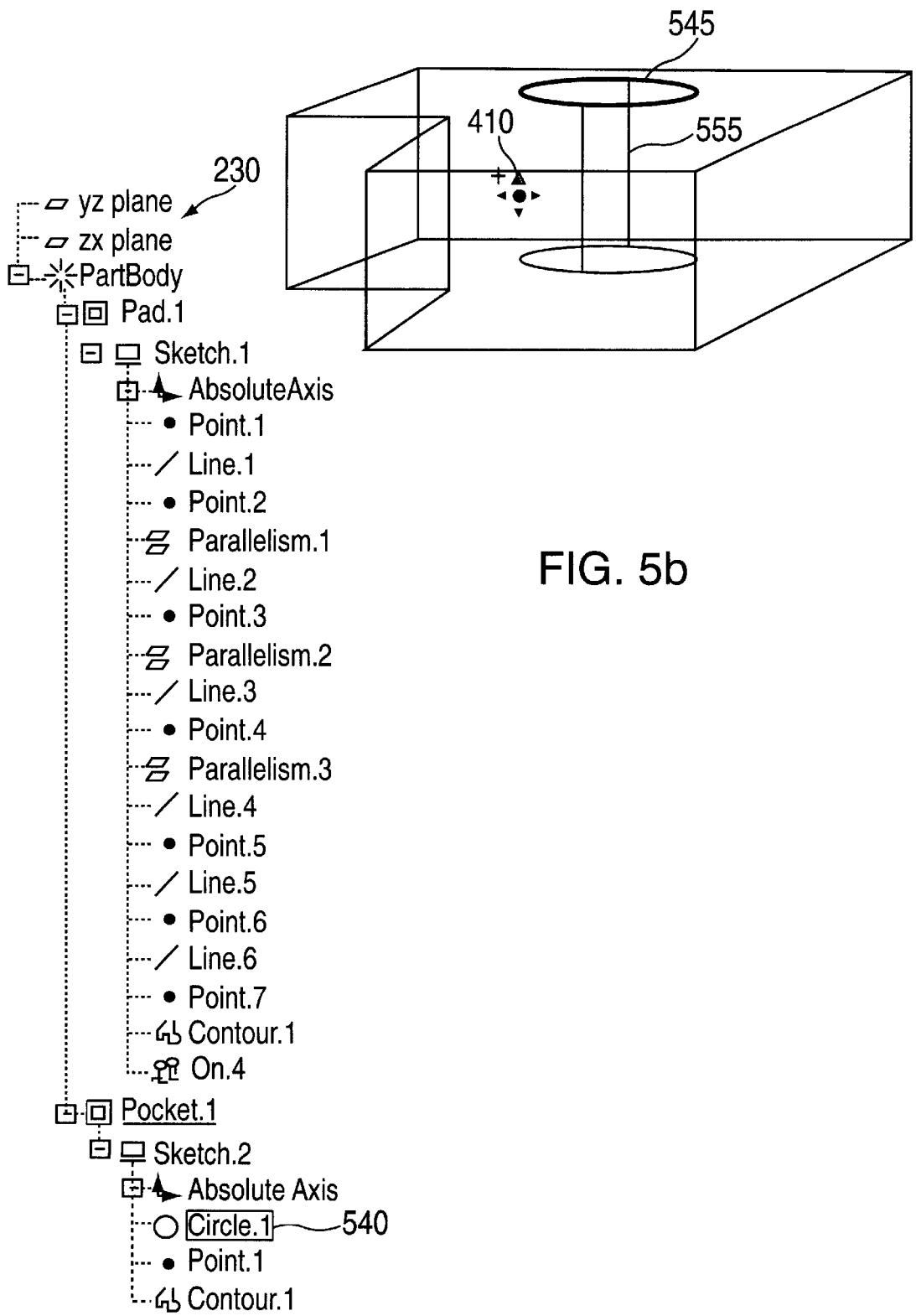
FIG. 5b is an isometric view of the model with the pre-selection having moved to a circle.

Referring now to FIG. 5b, an up arrow mechanism has been activated by the user to indicate that pre-selected element 511 of FIG. 5a is not the element wanted for final selection. The wanted element is assumed here to be a selectable element which is located behind (that is further away from the eye of the user) element 511. If navigator 400 is displayed and used by the user, as shown on FIG. 5b, up arrow 410 has been activated (it is shown as highlighted on FIG. 5b) by bringing the mouse pointer on arrow 410 and clicking on it with the primary button of the mouse. As a result of the activation of up arrow 410, pre-selection has shifted to the next selectable element on the depth axis, namely circle 545 forming the top of the cylindrical pocket 555. The same effect could have been obtained by depressing the up arrow key on the keyboard associated with the computer. Up and down arrows, whether on navigator 400 or on the keyboard, have been programmed to shift pre-selection to a next selectable element of the model further away from or closer to the eye of the user on the depth axis, respectively. If the hierarchical tree is displayed, the reference of circle 545 in the tree, namely Circle 1, referenced 540 on FIG. 5B, is highlighted too.

Figure 6:
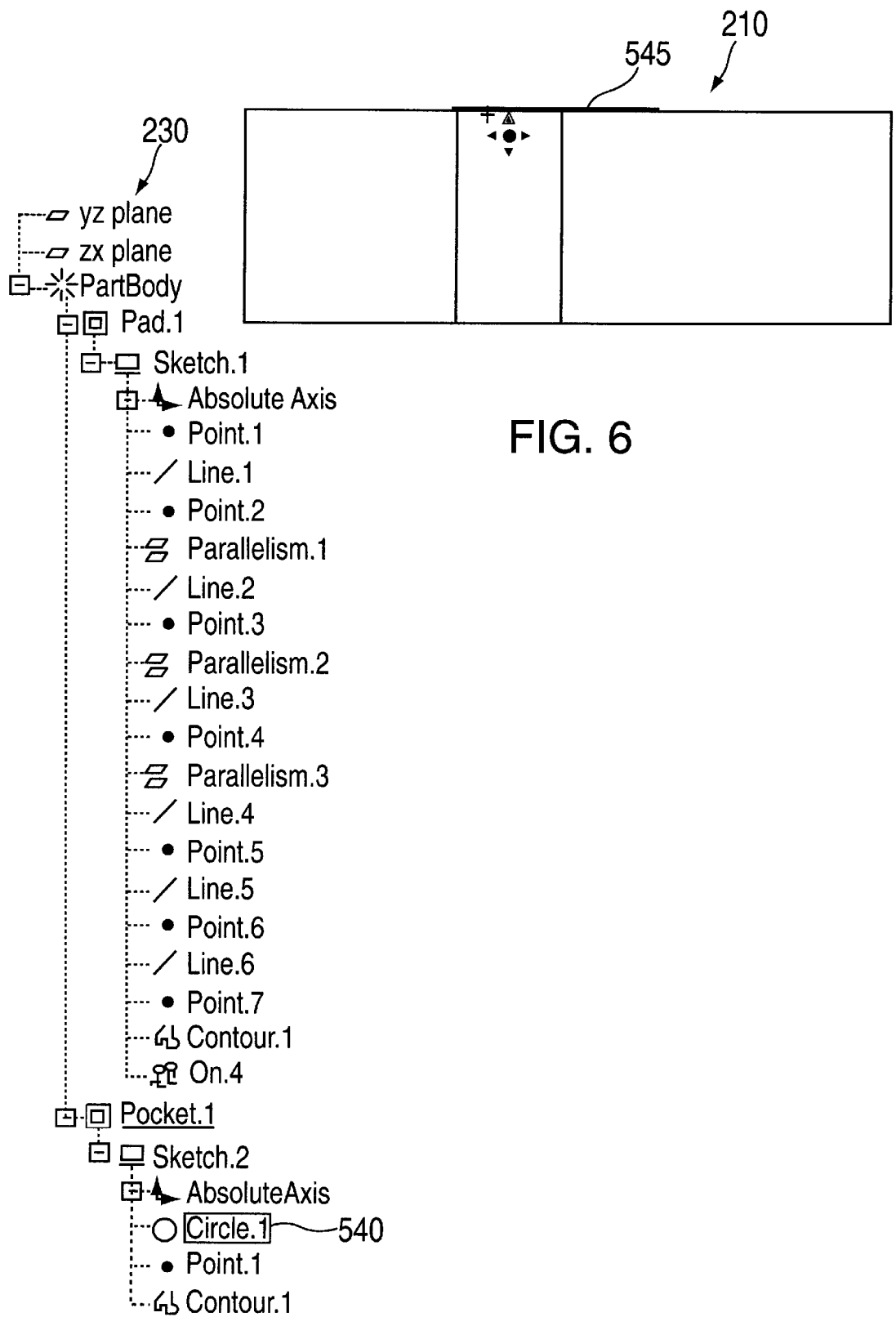
FIG. 6 is a profile view of the model corresponding to the isometric view of FIG. 5b.

FIG. 6 illustrates the same situation as FIG. 5b but on the profile view, which is the one actually presented to the user on the screen, as previously explained in reference to FIG. 3. Highlighted circle 545 appears as a highlighted portion of the top edge of model 210. In hierarchical tree 230 the same element 540 as in FIG. 5B is highlighted since the hierarchical tree is not dependent on the view presented to the user on the screen.

Figure 5C:
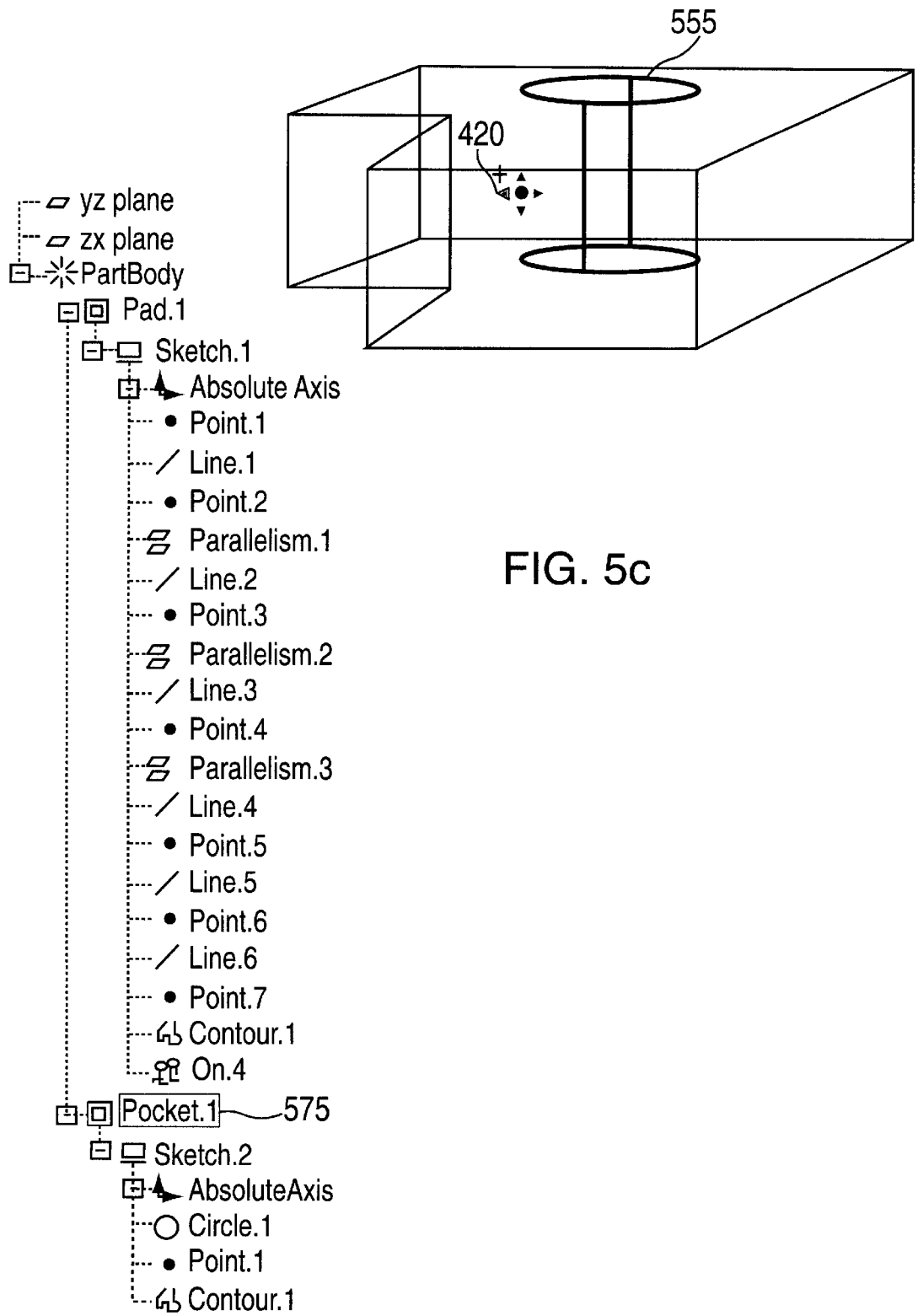
FIG. 5c is an isometric view of the model with the pre-selection having moved to a cylinder.
Figure 5D:
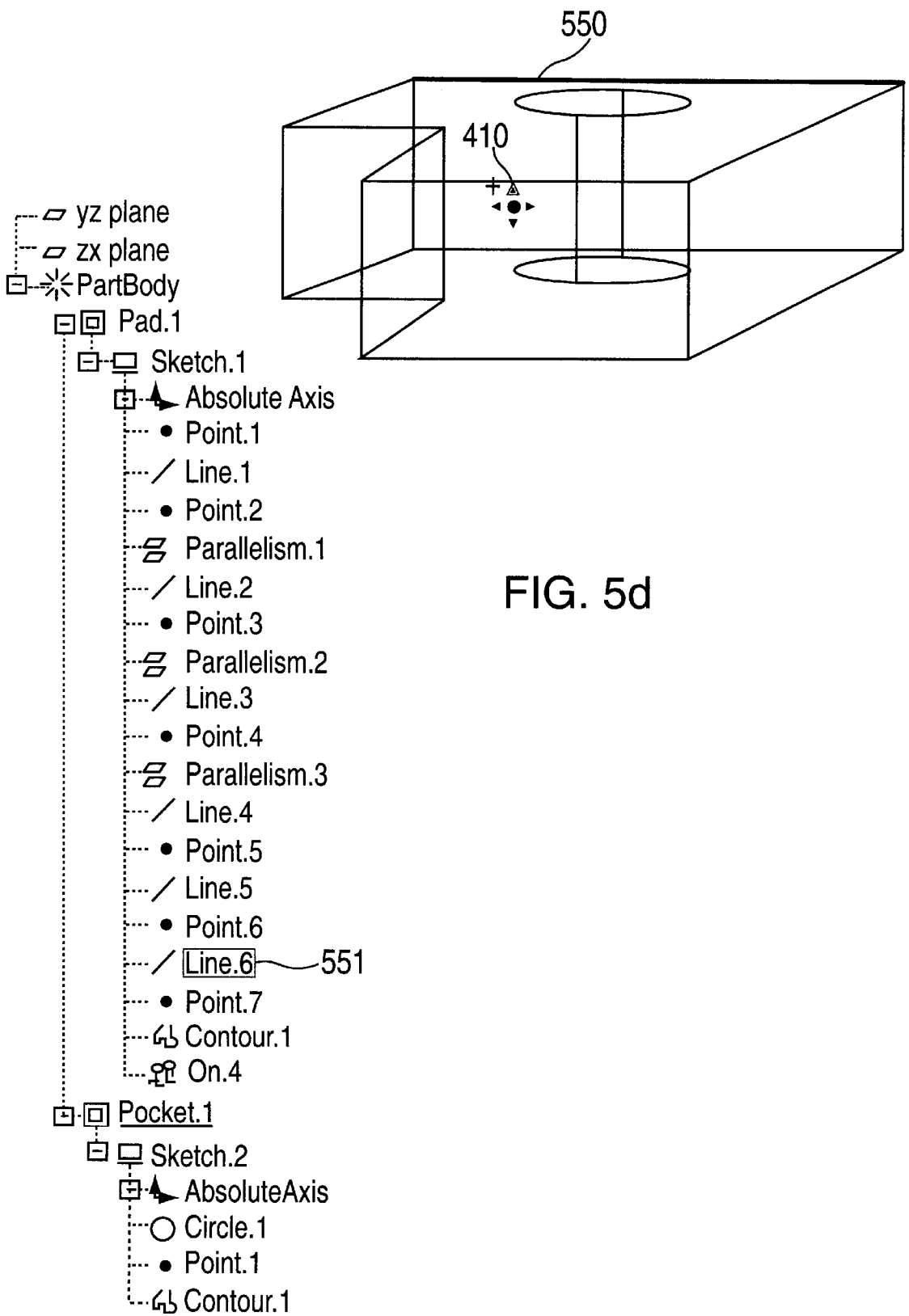
FIG. 5d is an isometric view of the model with the pre-selection having moved to a rear edge.

Referring now to FIGS. 5c and 5d, they illustrate two different scenarios evolving from the situation shown on FIG. 5b. In FIG. 5c a left arrow mechanism, which can be the left arrow 420 of navigator 400 or the left arrow key on the keyboard associated with the computer, has been activated. As a result, the pre-selection has shifted from circle 545 of FIG. 5b to the whole pocket 555, which is shown highlighted on FIG. 5c. At the same time, highlighting on the hierarchical tree has shifted from Circle 1, reference 540 on FIG. 5b, to Pocket 1, reference 575 on FIG. 5c. In the embodiment described, the left and right arrow mechanisms have been programmed to shift the pre-selection to a higher or lower level of specifications in the design specification tree, respectively. The tree shown on the drawings comprises three levels of specifications: the top level with the selectable element PartBody, the intermediate level with selectable elements Pad 1 and Pocket 1, and the lowest level with all the elements at the end of the tree branches. It will be understood that in most real life applications the tree will contain many more levels and elements. It will also be understood that, although the pre-selection shift caused by activation of the left and right arrow mechanisms has been defined in terms of movements to higher or lower levels in the specification tree, the actual display of the tree on the screen is not required for the practice of the invention. The graphical representation of the model contains as much pre-selection information as the tree. Although FIG. 5c shows the navigator on and the pre-selection shift being caused by activation of left arrow 420 of the navigator, the same result could have been obtained without the navigator, by using the left arrow key on a keyboard associated with the computer.

Referring now to FIG. 5d, it is shown what would have happened if, in the situation of FIG. 5b, the up arrow mechanism had been activated instead of the left arrow mechanism. Pre-selection has shifted from circle 540 on FIG. 5b to rear edge 550 of the model, as shown on FIG. 5d, that is to the next selectable element further away from the user's eye along the depth axis. The navigator is shown as being on and up arrow 410 of the navigator is highlighted to show that it has been activated. Here again, the same pre-selection shift could be obtained without the navigator, by depressing the up arrow key on the keyboard. On the optional display of the tree, pre-selection has shifted to Line 6, reference 551, which corresponds to rear edge 550 on the graphical representation of the model.

FIGS. 5a through 5d have been used to illustrate some of the possible steps in the navigation through the model. It will be readily understood that, starting from the preselection reached on FIG. 5d, activation of the down arrow would bring the pre-selection to that shown on FIG. 5b, while activation of the left arrow would result in the pre-selection of the whole block (Pad 1 on the specification tree). Similarly, starting from the situation shown on FIG. 5c, activation of the right arrow would bring the pre-selection to that shown on FIG. 5b.

At any step in the navigation, activation of the central button of the navigator when the latter is on will result in the full selection of the element then highlighted. Depressing the Enter key on an associated keyboard would have the same effect. When the navigator is not on, full selection of the then pre-selected element can be achieved by clicking with the primary button of the mouse. As can be seen from FIG. 6, the invention makes it possible for the user to select elements of the model, even though they are not visible on the screen, directly from the graphical representation of the model, without having to display the hierarchical tree and to find the element to be selected in the tree. From a general standpoint, the invention allows for freely navigating in three-dimensional computer generated models by using combinations of depth movements and hierarchical shifts. Although the invention has been described with reference to a navigation control mechanism using arrow keys on a keyboard or a graphical user interface navigator, other forms of navigation control mechanisms, such as a voice control mechanism, a joystick, a joypad, a space mouse or a space ball, could be used.

Figure 7:
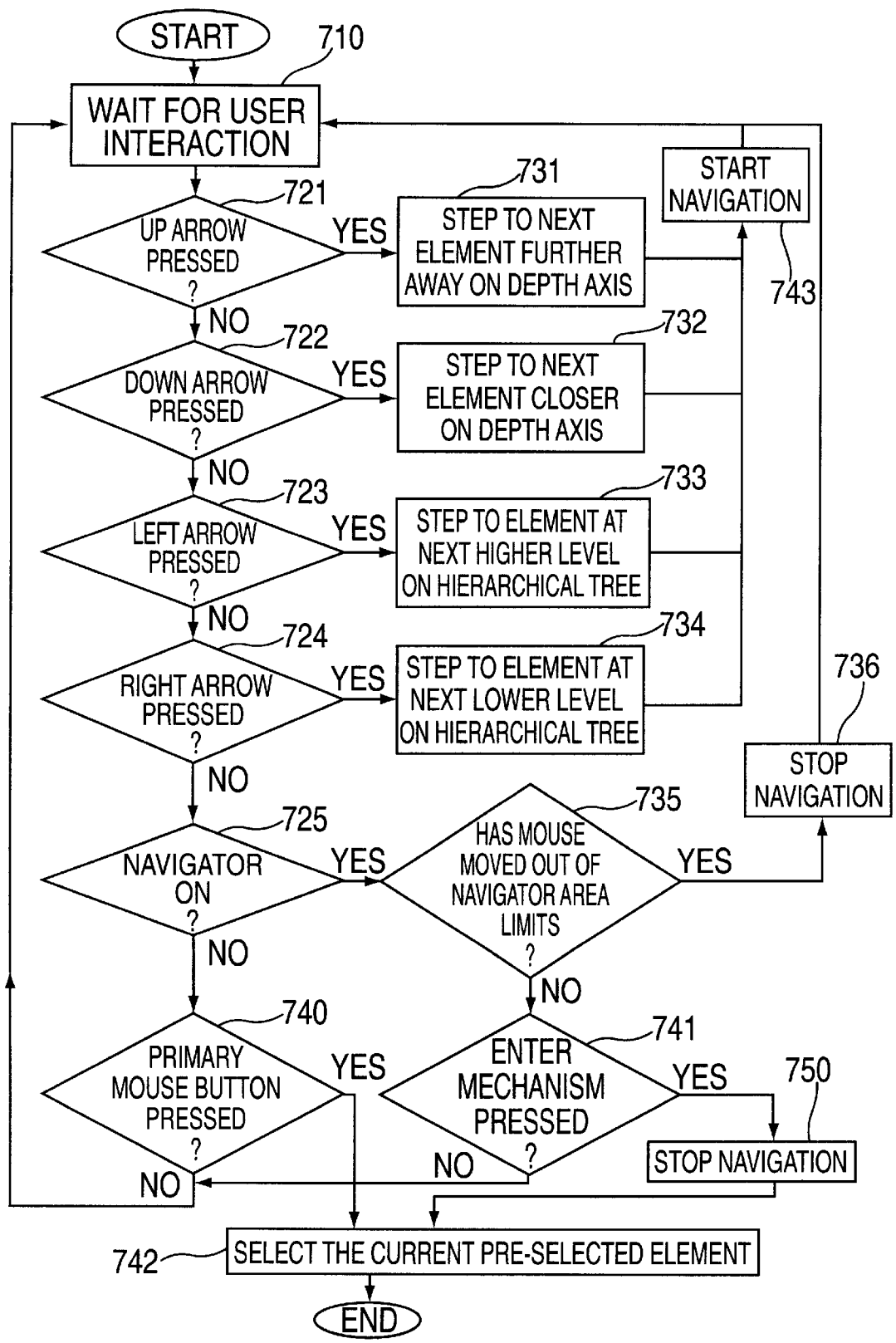
FIG. 7 illustrates a flow diagram of a program for controlling element selection.

Referring now to FIG. 7, a software program can start when the system detects movement of the mouse pointer over a pixel of the image of a model on the computer screen and pre-selects a selectable element corresponding to the location of the pointer. As mentioned above in relation to FIG. 5a, the pre-selected element may be any selectable element on the depth axis at the pixel reached by the pointer. When the movement stops, the program waits for a user interaction 710 to determine if the then pre-selected element is the one the user wants to select. Activating an arrow key on the keyboard or activating an arrow on the navigator can both function to <press an arrow>. If the user interaction consists in pressing the up arrow 721, the program shifts the pre-selection to the next further away selectable element along the depth axis. If the user interaction consists in pressing the down arrow 722, the program shifts the pre-selection to the next closer selectable element on the depth axis. If the user interaction consists in pressing the left arrow 723, the program shifts the pre-selection to the selectable element of the next higher level in the design specification tree. If the user interaction consists in pressing the right arrow 724, the program shifts the pre-selection to the element of the next lower level in the design specification tree. It will be readily understood that, although these various types of user interactions are shown on the flow diagram to be tested in a particular sequence, any particular sequence can be programmed or the program can just wait for a particular interaction to take place without testing the arrows in sequence. After any one of steps 731–734, the program enters the navigation mode at step 743 and waits for the next user interaction. Depending on the particular design option retained, the navigator can be set on at this step 743. In another option, it could be set on directly at step 710.

The program then tests at step 725 if the navigator is on. If so, the program tests at step 735 if the mouse pointer has moved out of the limits of the navigator area. If not, the program tests at step 741 if the central button of the navigator or the Enter key of the keyboard has been activated. If so, navigation stops at step 750 and the currently pre-selected element is fully selected at step 742 and the process ends.

If the program detects at step 725 that the navigator is not on, it then goes on to test if the primary button of the mouse is activated. If so, the currently pre-selected element is fully selected at step 742 and the process ends.

If the program detects at step 735 that the mouse has moved out of the navigation limits, navigation is stopped at step 736 and the program returns to a wait state. If the Enter mechanism at step 741 has not been activated, the program returns to a wait state. The same occurs if, at step 740, the primary button of the mouse has not been activated.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits). Other embodiments are within the scope of the following claims.

What is claimed is:

1. A method of selecting an element of a computer generated model graphically represented on a computer screen, wherein each selectable element of the model occupies a position in a hierarchical tree describing the model, the method comprising:

detecting a position of a pointer on the screen;

pre-selecting a first selectable element of the model on an axis extending from the position of the pointer along a predetermined direction wherein the direction is not in the plane of the screen;

moving pre-selection from said first selectable element to a second selectable element responsive to activation of a navigation control mechanism, wherein said second selectable element occupies a position in the hierarchical tree which is different from a position occupied by said first element; and activating a selection mechanism to select said second element.

2. The method of claim 1 wherein activation of the navigation control mechanism allows for a combination of movements along the spatial depth of the model and movements to higher and lower levels in the hierarchical tree.

3. The method of claim 1 additionally comprising the step of defining a navigation limit inclusive of a specified position of the pointer, wherein movement of the pointer within the navigation limit does not change the specified position of the pointer.

4. The method of claim 3 wherein a programmable menu is located within the navigation limit.

5. The method of claim 1 wherein the navigation control mechanism is a set of directional arrow keys on a keyboard associated with the computer, a first group of directional arrow keys in the set corresponding to a movement along the spatial depth of the model and a second group of directional arrow keys corresponding to a movement to higher and lower levels in the hierarchical tree, and wherein the step of moving pre-selection from the first selectable element to the second selectable element comprises: detecting activation of the directional arrow keys; and moving pre-selection according to the movement determined by the activated directional arrow keys.

6. The method of claim 1 wherein the second position occupies a different level on the hierarchical tree than the first position.

7. The method of claim 1 wherein the step of moving pre-selection from the first selectable element to the second selectable element comprises:

displaying on the screen a user activatible navigation control mechanism as a set of directional indicators, a first group of directional indicators in the set corresponding to a movement along the spatial depth of the model and a second group of directional indicators in the set corresponding to a movement to higher and lower levels in the hierarchical tree;

detecting activation of the directional indicators; and moving pre-selection according to the movement determined by the activated directional indicators.

8. The method of claim 1 wherein the arrow mechanism is an arrow key on a keyboard associated with the computer.

9. The method of claim 1 wherein the arrow mechanism is a user activatible control displayed on a screen by a software program.

10. The method of claim 1 wherein the selection mechanism is a primary button on a pointing device.

11. The method of claim 1 wherein the selection mechanism is a user activatible control displayed on a screen by a software program.

12. A computer readable medium having a computer program stored thereon, the computer program comprising instructions for causing a computer to select an element comprising a computer generated model in response to the steps of:

detecting a position of a pointer on the screen;

pre-selecting a first selectable element of the model on an axis extending from the position of the pointer along a predetermined direction wherein the direction is not in the plane of the screen;

moving pre-selection from said first selectable element to a second selectable element responsive to activation of a navigation control mechanism, wherein said second selectable element occupies a position in the hierarchical tree which is different from a position occupied by said first element; and activating a selection mechanism to select said second element.

13. The computer readable medium of claim 12 selection of an element comprising a computer generated drawing model is additionally in response to the step of:

testing for a selectable element on the axis extending from the position of the pointer and repositioning the pointer if a selectable element is not located along the axis extending from the position of the pointer.

14. The computer readable medium of claim 12 selection of an element comprising a computer generated drawing model is additionally in response to the step of:

defining a navigation limit inclusive of a specified position of the pointer, wherein movement of the pointer within the navigation limit does not change the specified position of the pointer.

15. A computer readable medium having a computer program stored thereon, the computer program comprising instructions for causing a computer to select an element comprising a computer generated drawing model in response to the steps of:

detecting a position of a pointer on the screen;

pre-selecting a first selectable element of the model on an axis extending from the position of the pointer along a predetermined direction wherein the direction is not in the plane of the screen;

moving pre-selection from said first selectable element to a second selectable element responsive to activation of a navigation control mechanism, wherein said second selectable element occupies a position in the hierarchical tree which is different from a position occupied by said first element; and activating a selection mechanism to select said second element.

16. A user interface invocable by an application program comprising:

a first display region to display a computer generated drawing model;

a second display region to select a view of the object modeled; and a third display region display a hierarchy of subparts of the model.

17. The user interface of claim 16 additionally comprising a fourth display region containing a programmable menu.

18. A method for selecting one of a plurality of graphical elements for display on a computer screen having an x-y plane, said plurality of graphical elements being aligned in a direction not in said x-y plane and at least one of said plurality of graphical elements being obscured by another of said plurality of graphical elements, the method comprising the steps of:

initially selecting one of said plurality of graphical elements;

indicating that said one of said plurality of graphical elements has been selected;

receiving an input for selecting said at least one of said plurality of graphical elements being obscured by another of said plurality of graphical elements;

selecting said at least one of said plurality of graphical elements being obscured by another of said plurality of graphical elements; and indicating that said at least one of the remaining elements being obscured by said at least one of said plurality of graphical elements has been selected.

19. The method of claim 18, wherein the step of indicating that said one of said plurality of graphical elements has been selected includes the step of:

highlighting said one of said plurality of graphical elements on said computer screen; and the step of indicating that said at least one of the remaining elements being obscured by said at least one of said plurality of graphical elements has been selected includes the step of:

highlighting said at least one of the remaining elements being obscured by said at least one of said plurality of graphical elements on said computer screen.

20. The method of claim 18, further comprising a hierarchical tree listing of said plurality of elements and wherein the step of indicating that said one of said plurality of graphical elements has been selected includes the step of:

highlighting said one of said plurality of graphical elements in said hierarchical tree; and the step of indicating that said at least one of the remaining elements being obscured by said at least one of said plurality of graphical elements has been selected includes the step of:

highlighting said at least one of the remaining elements being obscured by said at least one of said plurality of graphical elements in said hierarchical tree.

21. The method of claim 18 further comprising a hierarchical tree having a plurality of levels, at least some of said levels including at least one of said plurality of graphical elements, at least some of said levels including additional graphical elements, the method further comprising the steps of:

receiving an input for selecting one of said levels;

selecting all of said graphical elements included in said one of said levels; and indicating that all of said graphical elements included in said one of said levels have been selected.

22. The method of claim 21, wherein the step of indicating that all of said graphical elements included in said one of said levels have been selected includes the steps of:

highlighting all of said graphical elements included in said one of said levels on said computer screen; and highlighting said one of said levels in said hierarchical tree.

23. The method of claim 18, wherein the steps of selecting include the step of:

activating a navigation control mechanism.

24. The method of claim 23, wherein the navigation control mechanism include keys on a keyboard associated with said computer screen and the step of activating a navigation control mechanism includes the step of:

activating said keys.

25. The method of claim 23, wherein said navigation control mechanism includes selection indicators displayed on said computer screen and the step of activating a navigation control mechanism includes the step of:

activating said selection indicators.

26. A computer system having a processor operatively interconnected to a memory, an input device and a display device having a plane, wherein a plurality of graphical elements are aligned in a direction not in said plane and at least one of said plurality of graphical elements being obscured by another of said plurality of graphical elements, the computer system programmed to select one of said plurality of graphical elements for display on the display device in response to the steps of:

initially selecting one of said plurality of graphical elements;

indicating that said one of said plurality of graphical elements has been selected;

receiving an input for selecting said at least one of said plurality of graphical elements being obscured by another of said plurality of graphical elements;

selecting said at least one of said plurality of graphical elements being obscured by another of said plurality of graphical elements; and indicating that said at least one of the remaining elements being obscured by said at least one of said plurality of graphical elements has been selected.

27. The computer system of claim 26, wherein the step of indicating that said one of said plurality of graphical elements has been selected includes the step of:

highlighting said one of said plurality of graphical elements on said computer screen; and the step of indicating that said at least one of the remaining elements being obscured by said at least one of said plurality of graphical elements has been selected includes the step of:

highlighting said at least one of the remaining elements being obscured by said at least one of said plurality of graphical elements on said computer screen.

28. The computer system of claim 26, further comprising a hierarchical tree listing of said plurality of elements and wherein the step of indicating that said one of said plurality of graphical elements has been selected includes the step of:

highlighting said one of said plurality of graphical elements in said hierarchical tree; and the step of indicating that said at least one of the remaining elements being obscured by said at least one of said plurality of graphical elements has been selected includes the step of:

highlighting said at least one of the remaining elements being obscured by said at least one of said plurality of graphical elements in said hierarchical tree.

29. The computer system of claim 26 further comprising a hierarchical tree having a plurality of levels, at least some of said levels including at least one of said plurality of graphical elements, at least some of said levels including additional graphical elements, the method further comprising the steps of:

receiving an input for selecting one of said levels;

selecting all of said graphical elements included in said one of said levels; and indicating that all of said graphical elements included in said one of said levels have been selected.

30. The computer system of claim 20, wherein the step of indicating that all of said graphical elements included in said one of said levels have been selected includes the steps of:

highlighting all of said graphical elements included in said one of said levels on said computer screen; and highlighting said one of said levels in said hierarchical tree.

31. The computer system of claim 26, wherein the steps of selecting include the step of:

activating a navigation control mechanism.

32. The computer system of claim 31, wherein the navigation control mechanism include keys on a keyboard associated with said computer screen and the step of activating a navigation control mechanism includes the step of:

activating said keys.

33. The computer system of claim 31, wherein said navigation control mechanism includes selection indicators displayed on said computer screen and the step of activating a navigation control mechanism includes the step of:

activating said selection indicators.

* * * * *